United States Patent [19]
Hinshaw

[11] 3,994,522
[45] Nov. 30, 1976

[54] BAILING DEVICE AND METHOD
[76] Inventor: Walter L. Hinshaw, 3200 Alamance Road, Burlington, N.C. 27215
[22] Filed: Apr. 7, 1975
[21] Appl. No.: 565,723

[52] U.S. Cl. .............................. 294/68; 220/209; 294/55
[51] Int. Cl.² .................... B65D 51/12; E21B 31/04
[58] Field of Search ............... 137/525.3; 141/2, 18; 294/68, 55, 69 R, 69 A; 220/202, 203, 209

[56] References Cited
UNITED STATES PATENTS
300,977   6/1884   Howell ............................ 294/69 R
FOREIGN PATENTS OR APPLICATIONS
1,414,922   9/1964   France ............................ 137/525.3

Primary Examiner—Richard E. Aegerter
Assistant Examiner—Frederick R. Schmidt
Attorney, Agent, or Firm—B. B. Olive

[57] ABSTRACT

A rigid, tubular bailing device has an open top and a closed bottom made from pliable material. An integral, flap-type check valve is formed in the bottom by cutting the valve from the pliable material and leaving a small portion uncut to act as a hinge. The edge of the valve is tapered so that the valve will seat properly when closed. By providing an up/down motion of the bailing device, water is pumped up into the device through the check valve and prevented from escaping when the valve closes.

4 Claims, 9 Drawing Figures

BAILING DEVICE AND METHOD

BACKGROUND OF THE INVENTION

1. Field of the Invention

The present invention relates to an improved hand operated device for bailing water from boats, toilet tanks, sinks, basements, post holes, golf cups, aquariums, etc.

2. Description of the Prior Art

A number of patents have issued directed to devices for bailing water or other related uses. It is believed that no satisfactory device has been developed with a flap-type check valve cut from the bottom surface and which will operate when there is a minimal depth of water to be removed.

U.S. Pat. Nos. 519,431; 897,324; 1,333,793; 1,378,450; 1,003,874; and 3,796,238 are illustrative of bailing devices or buckets which have bottom flaps or valves for entrance of water therethrough.

SUMMARY OF THE INVENTION

A rigid, tubular shaped container is open at one end thereof and in the preferred embodiment receives a plastic cap at the other end. The plastic cap snaps onto the container effectively closing one end of the container. The plastic cap has an opening cut therein so that the opening is not completely severed from the cap. The unsevered portion effectively acts as a pliable hinge for the flap portion remaining. The flap portion when cut into the cap is cut with a tapered edge so that the flap portion can rise into the interior of the container and upon returning to the cap seats itself so that water cannot leak from within the container. The flap cannot pass downward beyond its position in the cap. An up/down motion of the container causes the flap to allow water to enter through the opening, and upon lifting the container completely from the water the flap closes and prevents leakage or pouring of the water therein through the bottom opening.

It is conceivable, also, to mold the complete bailing device from a pliable material with the flap being molded into the device. Appropriate handle and spout means could be molded into the device of this embodiment. Various sizes can also be made so that the invention bailing device can be used for various purposes.

DESCRIPTION OF THE PREFERRED EMBODIMENT

Figure 1:
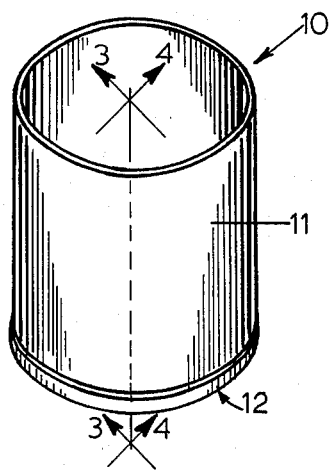
FIG. 1 is a perspective view of the bailing device of this invention in a preferred embodiment.
Figure 5:
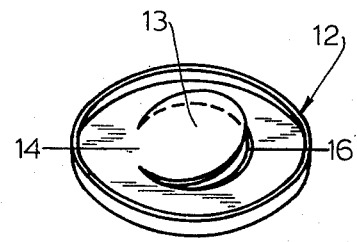
FIG. 5 is a perspective view of the removable cap and illustrating the flap valve.
Figure 2:
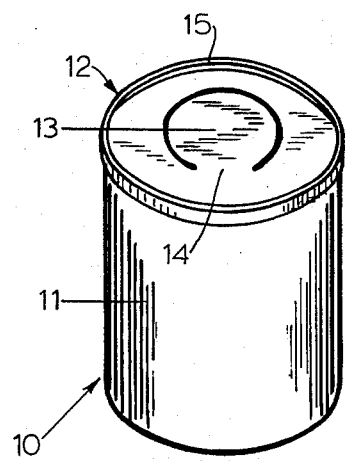
FIG. 2 is a perspective view similar to that of FIG. 1 except that it illustrates the bottom, removable cap of the preferred embodiment.
Figure 3:
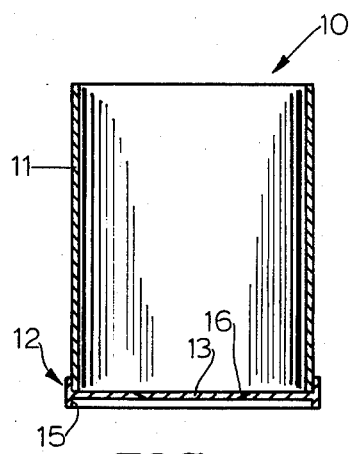
FIG. 3 is a section view taken substantially along line 3—3 of FIG. 1.
Figure 4:
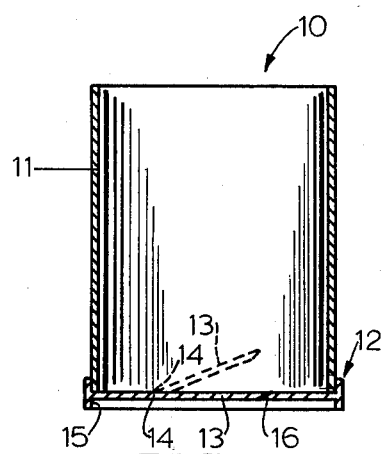
FIG. 4 is a section view taken substantially along line 4—4 of FIG. 1.

Referring specifically to FIGS. 1 through 5, bailing device 10 comprises a cylindrical shaped member 11 and a cap member 12. Cylindrical member 11 can be of any suitable rigid material. A simple and inexpensive bailing device 10 of this type has been constructed from a typical 4 inch diameter can such as is used for coffee, canned nuts, etc., and which has had both ends cut therefrom. Cap member 12 is a typical pliable plastic cap, approximately 1/32 inch thick, which is supplied with cans of coffee for reclosing the open end. To form a flap-type check valve, flap 13 has been cut into cap 12 and has a tapered edge as illustrated in FIGS. 3 and 4. Flap 13 is not completely severed from cap 12 but has an unsevered hinge portion 14 which provides a pivot for flap 13. A low rim 15 conventionally extends around cap 12 on its bottom side and is therefore shown in the drawings. However, even though rim 15 does not interfere when the liquid being bailed is relatively deep, such a rim is not necessary to the invention and it is preferred that rim 15 be removed and that the bottom side of cap 12 be flat and smooth particularly when bailing very shallow depths of water. Such a smooth surfaced cap can be readily molded specifically for purposes of the invention.

Any relatively thin, resilient, pliable material including any of the well known plastics or thin metal sheets and which is suited to forming such a bendable flap valve out of the wall material itself can be employed for the container base or bottom. It should be appreciated that the thinness of the material used to form the bottom wall is determined by the resiliency and pliability of the material. For example, a valve made from thin metal would be a great deal thinner than a valve made from a very pliable plastic or rubber in order to provide the desired valve characteristics.

While the valve has been shown in each of the embodiments as a substantially circular valve, it could be shaped in other forms such as oblong or rectangular. The mating edge between flap 13 and flap seat 16 has been shown as a tapered edge formed by cutting the valve from the bottom wall. It should be appreciated that the flap and flap seat can mate in a configuration other than a tapered edge so long as the flap will satisfactorily seat in the flap seat. For example, a recessed surface could be provided in the center of the bottom wall, and to construct a valve the bottom wall is severed along the recess so that the recessed surface forms the flap. The valve would seat along the recess.

In the preferred embodiment, it can be seen that because flap 13 is cut from cap 12, flap 13 and flap seat 16 mate perfectly. Any irregularity in severance on one would have identical mating irregularity on the other. No screws, glue, bolts, nails or any other connecting means is needed. Therefore, no corrosive materials are present to contend with.

Device 10 may be filled with water in two ways. When the pool of water to be removed is relatively deep (e.g. over 2 inches), the device can be submerged in the pool until the bottom surface of the device rests on the bottom of the pool. Without any pumping motion, the water will enter the valve and rise in the container until the level of water in the container equals the level of water in the pool, and thus the pressures are equalized. Device 10 is then picked up and flap 13 drops to its closed position due to the downward weight of the water in the device. The seating of flap 13 prevents any leakage of water through the valve.

When the level of water in the pool is relatively shallow, the above method of equalizing pressure has proved to be unsatisfactory for quick and efficient removal of water. In these situations, water can be pumped into device 10. A simple up/down motion will force water into the device. Continued up/down movement acts to provide a pumping effect and causes flap 13 to open and close with each up/down movement and in effect pumps water into member 11 to a height substantially above the level of water in the surrounding pool.

Figure 6:
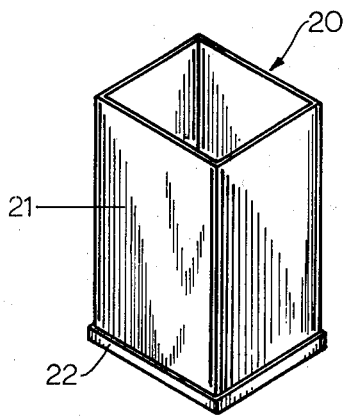
FIG. 6 is a perspective view of an alternate embodiment shape of the bailing device and also having a removable cap portion.
Figure 7:
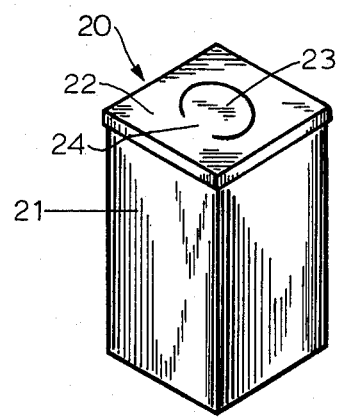
FIG. 7 is a perspective view similar to that of FIG. 6 illustrating the bottom cap member.

FIGS. 6 and 7 illustrate an alternate embodiment bailing device 20. Container 21, with a substantially square cross section, has both ends open as in the preferred embodiment. Container 21 receives a square cap 22 which in this case has a smooth outside surface and which closes one end of container 21. Cap 22 also has a flap 23 cut therein with a hinge portion 24. Flap 23 has a tapered edge similar to the edge of flap 13. This embodiment works in the same manner as the first embodiment.

Figure 8:
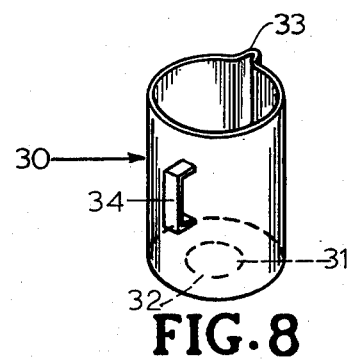
FIG. 8 is another embodiment molded with a handle and spout.

FIG. 8 illustrates a third embodiment of the present invention bailing device. Bailing device 30 is illustrated as being molded as a one piece device with the base material being relatively thin and pliable and having a smooth outside surface. Bailing device 30 has a flap 31 molded therein with a pliable hinge portion 32. Flap 31 as in the other embodiments is tapered for the same purpose. Bailing device 30 has a spout 33 molded integrally therein for pouring off of the removed water. Also for ease in handling, a handle 32 is molded integrally with device 30.

Figure 9:
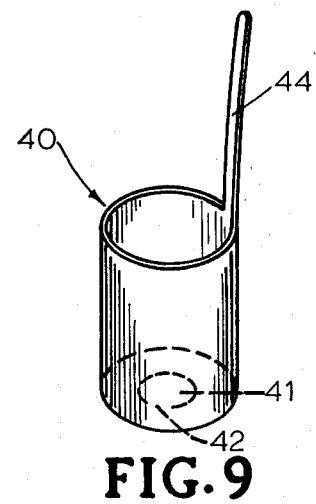
FIG. 9 is a still further embodiment of a molded device having an integral handle.

A still further embodiment of this invention is bailing device 40 of FIG. 9. Device 40 is molded as a one piece device of cylindrical shape. An integral flap 41 has a hinge portion 42. An elongated handle 44 is molded integral with bailing device 40 and extends upward so that the user will not have to bend over when employing device 40. This particular embodiment is especially useful for removing water from post holes, golf cups, etc. where the bailing device is actually set into the hole which contains the water. Also, bailing device 40 could be made smaller in diameter for use particularly with post holes and golf cups.

Having described the preferred and various alternate embodiments of construction, an example of use will be described. If the user were going fishing and wanted to use his boat after a shower of rain, he might encounter water standing in the bottom of his boat. With this simple bailer he could use an up/down motion to pump most of this water into the bailer. By tilting the boat to one side and allowing the water to rush to the lowest point, he can pump (raise) the water level into the bailing device to several inches while the water in the boat may not be more than ½ inch deep.

Also, as another use of the bailing device, anyone desiring to salvage liquid from the top of a body of water without disturbing or stirring up sediment or pollutants that have settled to the bottom would find the present invention very useful. Likewise, this invention would be very useful to remove pollutants that may have risen to the top of a fluid, e.g. oil on water. The container may also be made with a collapsible side wall and relatively rigid bottom wall for use as a drinking cup in camping activities. These and many other applications are possible with this bailing device.

What is claimed is:

1. An apparatus for bailing water, comprising a tubular container having open top and bottom ends and a bottom wall formed from a pliable material, said bottom wall having a peripheral rim in snap-fitted detachable engagement with said container bottom end and having an integral flap-type check valve formed centrally therein, said valve having a flap portion of predetermined shape and size free to swing upward into said container opposite an identically-shaped opening in said bottom wall and an integral hinge portion connecting said flap portion and a surrounding portion of said bottom wall, said valve portion and bottom wall opening having mated tapered edges adapted for supporting and leak-proof seating of said valve when closed.

2. The apparatus of claim 1 in which said container comprises a rigid cylindrical container and said bottom wall comprises a pliable round cap member.

3. The apparatus of claim 1 in which said container is molded as one piece and includes molded integral therewith on opposite sides of the container a spout and a handle.

4. The apparatus of claim 1 in which said container is molded as one piece and includes molded integral therewith an elongated handle extending upwardly from said container.

* * * * *